United States Patent [19]

Choi

[11] Patent Number: 5,702,625
[45] Date of Patent: Dec. 30, 1997

[54] ENCODER KEY INPUT DEVICE FOR A MICROWAVE OVEN AND INTERRUPT PROCESSING METHOD USING THE SAME

[75] Inventor: Kyung-Hwan Choi, Seoul, Rep. of Korea

[73] Assignee: LG Electronics Inc., Rep. of Korea

[21] Appl. No.: 383,403

[22] Filed: Feb. 3, 1995

[30] Foreign Application Priority Data

Feb. 3, 1994 [KR] Rep. of Korea .............. 1994-2026

[51] Int. Cl.$^6$ ............................................. H05B 6/68
[52] U.S. Cl. .................. 219/702; 219/720; 219/506; 341/22; 364/477
[58] Field of Search ........................ 219/702, 715, 219/719, 720, 506; 341/22, 26; 364/477

[56] References Cited

U.S. PATENT DOCUMENTS

| | | |
|---|---|---|
| 4,295,027 | 10/1981 | Zushi et al. ............... 219/712 |
| 4,356,370 | 10/1982 | Horinouchi ............... 219/702 |
| 4,470,038 | 9/1984 | Amano et al. ............. 341/26 |
| 4,720,799 | 1/1988 | Woithe et al. ............. 364/509 |
| 4,821,033 | 4/1989 | Mori et al. ............... 341/24 |
| 4,845,467 | 7/1989 | Nagaoka ................. 341/24 |

Primary Examiner—Philip H. Leung
Attorney, Agent, or Firm—Bell, Boyd & Lloyd

[57] ABSTRACT

This invention relates to an encoder key input device in which the number of ports of microcomputer for encoder circuit having key matrix input and encoder key input in common includes a microcomputer for generating first and second scanning signal, a key matrix circuit for outputting the key signal scanned by the first scanning signal generated from the microcomputer to the microcomputer, and an encoder circuit for outputting the encoder signal scanned by the second scanning signal to the microcomputer via key matrix circuit.

3 Claims, 6 Drawing Sheets

FIG.6B

ENCODER KEY INPUT DEVICE FOR A MICROWAVE OVEN AND INTERRUPT PROCESSING METHOD USING THE SAME

The present invention relates to a microwave oven, and more particularly, to an encoder key input device in which the number of ports of microcomputer for encoder circuit having key matrix input and encoder key input in common and the interrupt processing method using the same.

BACKGROUND OF THE INVENTION

Figure 1:
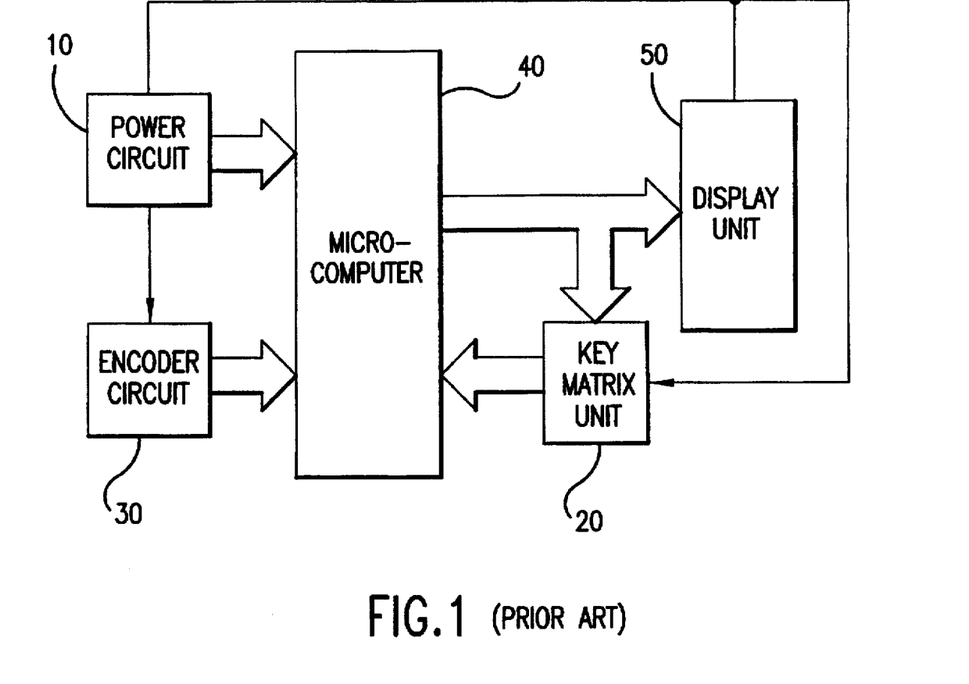
FIG. 1 is a block diagram of the control system for a conventional microwave oven.

A control system for a conventional microwave oven includes a power circuit 10 for supplying power to various ports of the apparatus, a key matrix unit 20 for inputting user's function selection signal, an encoder circuit 30 for encoding numeral or character stream as separate codes, a microcomputer 40 for controlling the overall operation of the system in accordance with the signals obtained from the encoder circuit 30 and the key matrix unit 20, respectively, and a display circuit 50 for displaying the corresponding signal in accordance with the control of the microcomputer 40, as shown in FIG. 1

The control system of the microwave oven having the aforementioned configuration will now be described with reference to FIGS. 2 and 3.

If power is supplied to the respective ports of the system by means of the power circuit 10, the microcomputer 40 periodically applies a display signal (in the form of grid or anode waveform) to the key matrix unit 20 to then scan the vertical stream of keys.

Figure 2:
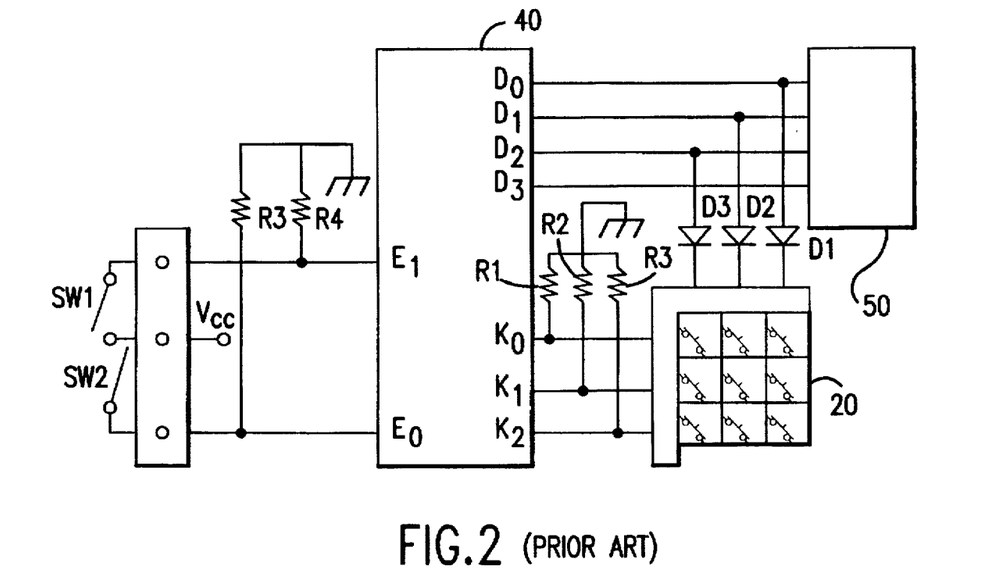
FIG. 2 is a detailed circuit diagram of various parts shown in FIG. 1.

That is to say, as shown in FIG. 2, the microcomputer 40 a display signal from ports $D_0$ to $D_2$ to the key matrix unit 20 via the respective diodes D1 to D3, and thereafter, detects the signal output from the key matrix unit 20 and input thereto via ports K0 to K2 so as to be recognized the user's input key.

If the user presses the key when the display signal is applied to the key matrix unit 20, a high signal is input to the port selected and pressed by the user, among the ports K0 to K2. The microcomputer 40 analyzes the port to which the high signal is input and recognizes the user's key input.

Here, since the key scanning method should be performed periodically as described above, it is processed in an interrupt routine. The interrupt routine will now be described with reference to the flowchart shown in FIG. 3A.

Figure 3A:
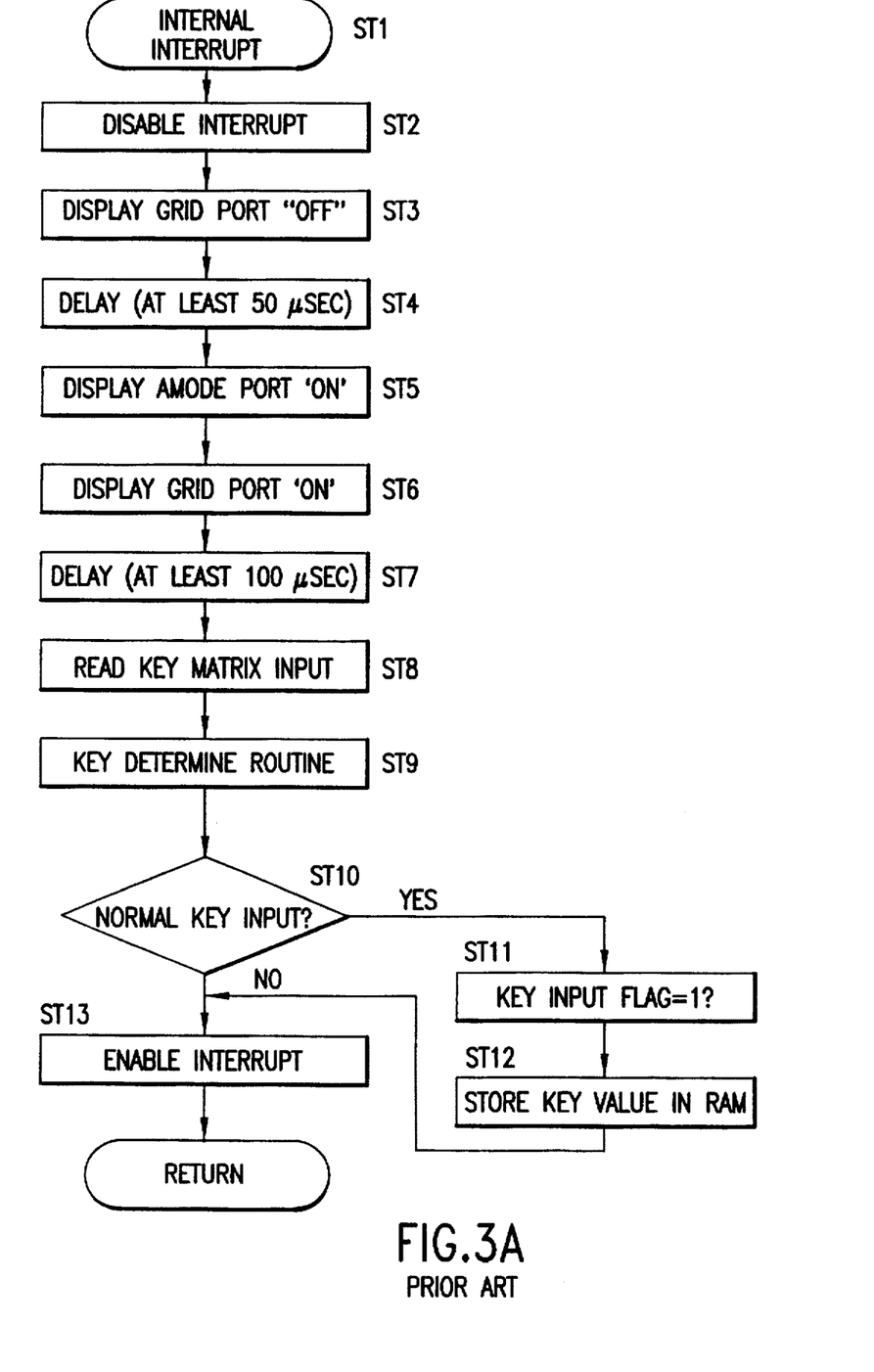
FIG. 3A is an internal interrupt processing routine and FIG. 3B is a main routine.

First, the interrupt is enabled and then the grid port of the display unit 50 is turned off (Steps 1 to 3). After performing the steps, a predetermined delay time of at least 50 μsec or more is secured (Step 4).

Thereafter, the anode port of the display unit 50 is turned on and the grid port is also turned on (Steps 5 and 6). After performing the steps, a predetermined delay time of at least 100 μsec or more is secured (Step 7).

After the above steps, the values input to input ports K0 to K2 are read and it is processed to a key determining step for determining which key is selected (Steps 8 and 9).

After the key determining step, it is determined whether the value of the selected key is normal or not (Step 10). As the determination result of the above step, if the key value is input normally, key input flag is set as 1 (Step 11) and the read key value is stored in RAM (Step 12).

If the input key value is not normal, the interrupt is enabled (Step 13) and the above steps after the interrupt disabling step are iterated to then process the interrupt.

Also, in the encoder circuit 30, if the encoder knob is turned, the input of the encoder is set to then be input to ports E1 and E0 of the microcomputer 40, separately.

Figure 3B:
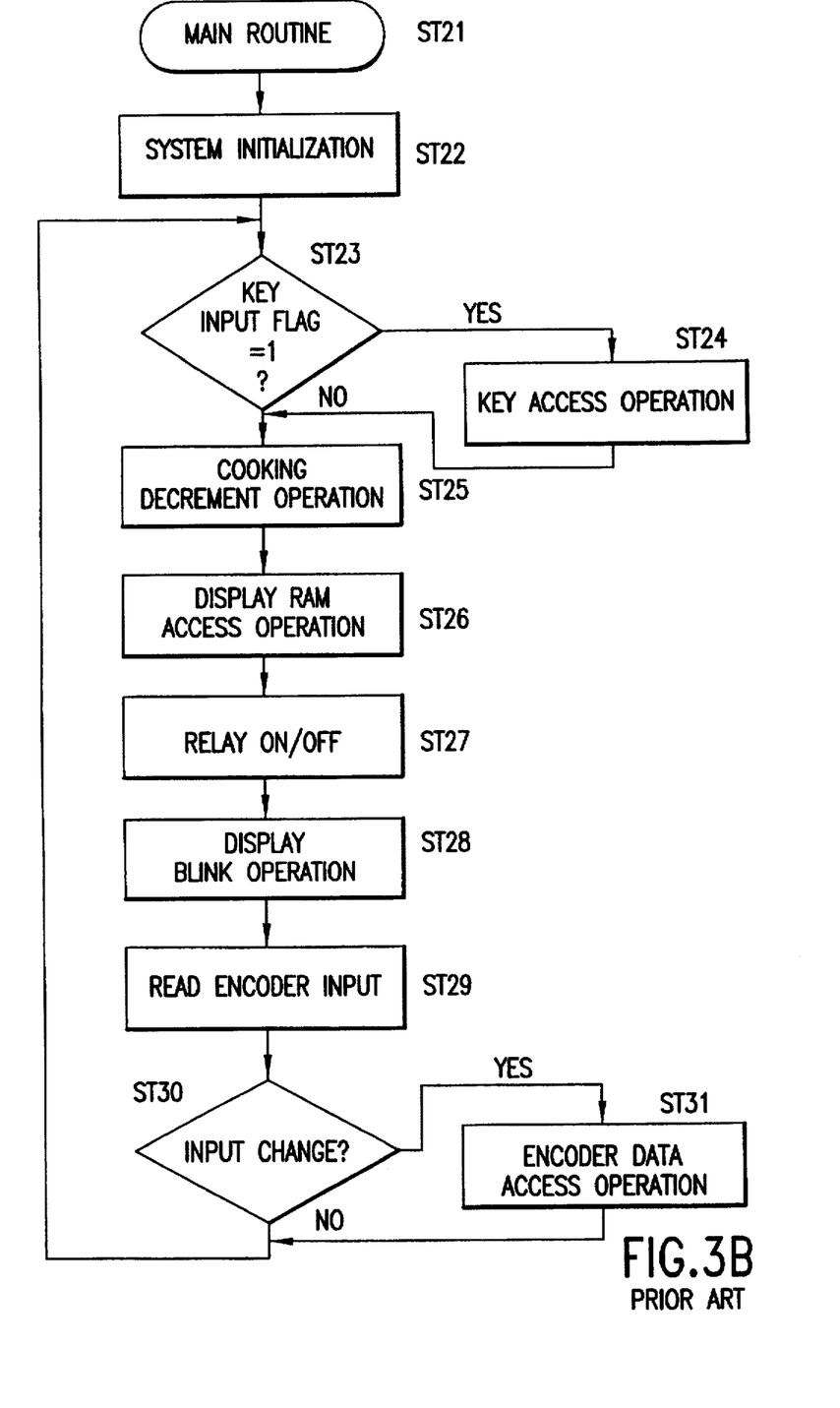

That is to say, the microcomputer 40 performs the initialization of the system and detects the key input flag in such initialized state (Steps 21 to 23). As the detection result, if the key input flag is set as 1, a key access is operated to then perform the function in accordance with the corresponding key (Step 24).

If as the result of detecting the key input flag, if the key input flag is set as 1, it is determined that there is no key input and then perform a cooking decrement operation (Step 25). Thereafter, display RAM is accessed and then relay is turned on and off (Steps 26 and 27).

Then, a display blink is performed to then read the encoder input (Step 28 and 29). Thereafter, it is determined that there is a change in the read encoder input values or not (Step 30). As the result, if there is a change in the input values, it is determined that the encoder is turned and then the access operation for increasing or decreasing the data, i.e., cooking data, to the corresponding RAM is performed (Step 31). If there is no change in the encoder inputs, the above steps following the system initialization step are again iterated.

However, in the conventional microwave oven, since key scan and encoder circuits are used separately, many input ports are required for the microcomputer.

That is to say, while the microcomputer for a single functional microwave oven requires 40 pins, 64 pins are necessary in the case the key scan and encoder circuits are separately installed. As the result, the cost for the microcomputer becomes high, thereby increasing the manufacturing cost and unit price therefor.

SUMMARY OF THE INVENTION

Therefore, it is an object of the present invention to provide an encoder key input device for a microwave oven in which the number of ports of the microcomputer for an encoder circuit having key matrix input port and encoder key input port in common.

Another object of the present invention is to provide an interrupt processing method using the encoder key input device.

The above object is attained by an encoder key input device for a microwave oven comprising:

a microcomputer for generating first and second scanning signals;

a key matrix circuit for outputting key signal scanned by the first scanning signal generated from the microcomputer to the microcomputer; and an encoder circuit for outputting the encoder signal scanned by the second scanning signal to the microcomputer via key matrix circuit.

The other object of the present invention is attained by an interrupt processing method for a microwave oven comprising the steps of:

determining whether a key scan mode is an encoder scan mode or a key matrix scan mode in the state where anode and grid ports in the display are all turned on;

determining whether there is an input change or not by reading the input of the encoder if the determined key scan mode is the encoder scan mode;

setting an encoder input flag as 1, storing the encoder data in a RAM and then enabling the interrupt, if there is an input change of the encoder;

determining whether a key matrix input is a normal key input by reading the key matrix input if the determined key scan mode is the key matrix scan mode;

setting the key input flag as 1 if the normal key is input in the above determining step, and storing the input key value in the RAM; and enabling the interrupt if the normal key is not input in the above determining step.

BRIEF DESCRIPTION OF THE DRAWINGS

The above objects and advantages of the present invention will become more apparent by describing in detail a preferred embodiment thereof with reference to the attached drawings in which:

FIG. 3 is an operational flowchart of FIG. 1, in which

FIG. 6 is a flowchart of the encoder key input signal according to the present invention, in which

DETAILED DESCRIPTION OF THE INVENTION

Figure 4:
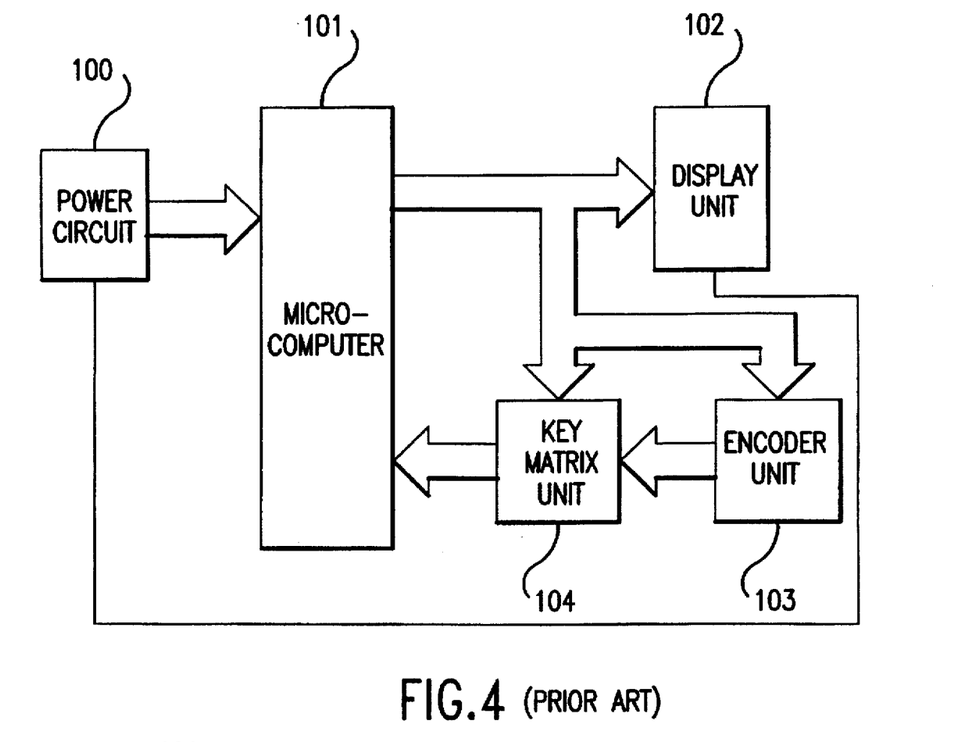
FIG. 4 is a block diagram of the encoder key input device for a microwave oven according to the present invention.

In FIG. 4, the encoder key input device according to the present invention includes a power circuit 100 for supplying power to various ports of the system, a microcomputer 101 for controlling the overall operation of the system, a display 102 for displaying the corresponding function in accordance with the display signal output from the microcomputer 101, the display 102 having a plurality of input ports 105, an encoder circuit 103 for receiving the display signal output from the microcomputer 101 via a common port 110 and outputting an encoder key input signal to first matrix input ports 107, and a key matrix unit 104 for receiving the display signal output at second input ports 108 from the microcomputer 101 and applying key input and encoder input in common via one of output ports 106 and one of parallel lines 115 to the one of input ports P5–P8 of the microcomputer 101 by being connected with the output port of the encoder circuit 103 in a common line.

The operation and effect of the encoder key input device according to the present invention having the aforementioned configuration will now be described with reference to FIGS. 5 and 6.

First, if power is supplied to various ports of the system via the power circuit 100, the microcomputer 101 scans keys in the state where various input and output ports are initialized.

The microcomputer 101 turns off the grid port of the display unit 102 in the state where the interrupt is disabled, and thereafter, a predetermined delay time of at least 50 μsec or more is secured (Steps 1 to 4).

Thereafter, the anode port and grid port of the display unit 102 are turned on and then a predetermined delay time of at least 100 μsec or more is secured, as described above (Steps 5 to 7).

Then, the input ports P5 to P8 are detected and scanned to determine whether the input signal is an encoder key input signal or a keyinput signal to then read the input of the encoder (Steps 108 and 109).

Figure 5:
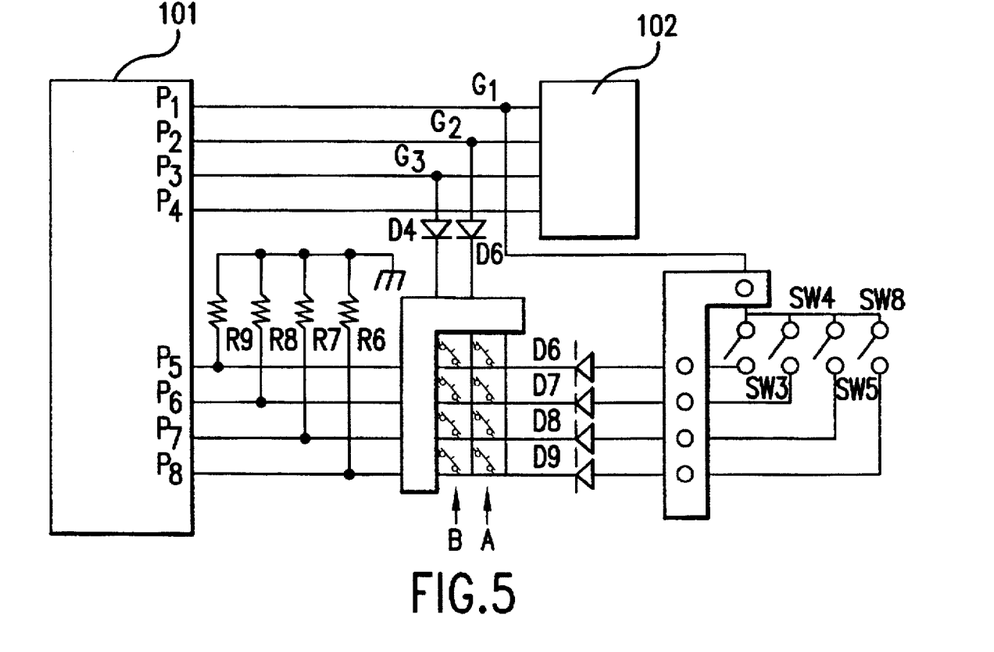
FIG. 5 is a detailed diagram of various parts shown in FIG. 4.
Figure 6A:
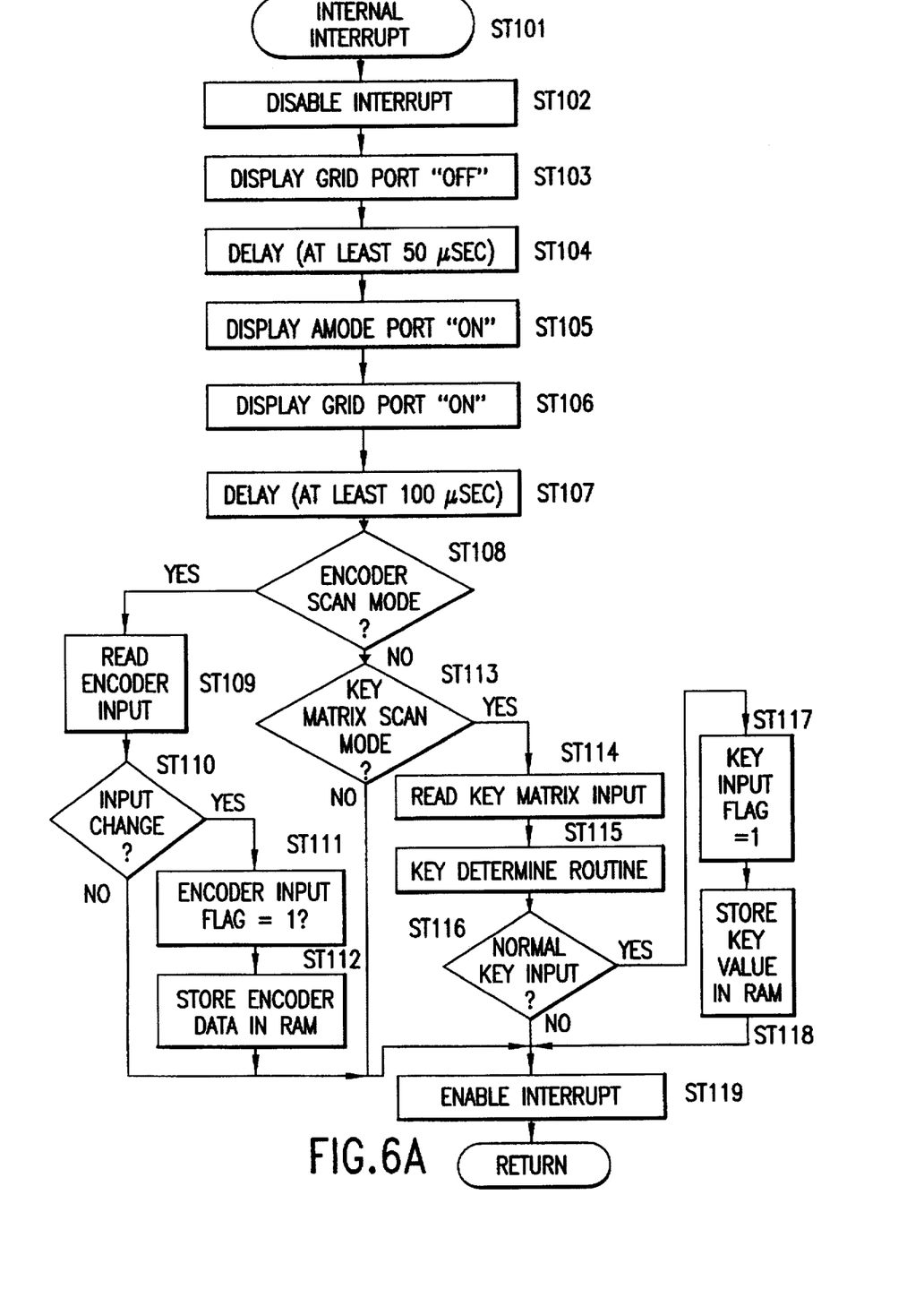
FIG. 6A is an internal interrupt processing routine and FIG. 6B is a main routine.

That is to say, as shown in FIG. 5, the microcomputer 101 outputs the first display signal, i.e., G1, as a high signal to then be applied to the encoder circuit 103. Subsequently, the values input to the input ports P5 to P8 are detected to determine the presence or absence of the key input (Step 110).

As the result of determining the presence or absence of the encoder key input, if there is a change in input port, which means that the encoder dial has been turned, the encoder input flag is set as 1, the encoder data is stored in the RAM and then the interrupt is enabled (Steps 111 and 112).

Also, a display signal is applied to the common port of the encoder to then detect the input change of the encoder. Thereafter, if a predetermined time passes, the second display signal G2 is again turned, thereby scanning a stream A of the key matrix unit 104.

Next, the input values of input ports P5 to P8 are detected to determine the presence or absence of key inputs (Step 113).

As the result of the key input determination, if the signal input via the input ports P5 to P8 represents a normal key input having at least one high signal, the key input flag is set as 1 (Steps 114 to 117). Then, the key value is stored in the RAM and the interrupt is enabled (Steps 118 and 119).

Also, as described above, after scanning the stream A of the key matrix unit 104, if a predetermined time passes again, a third display signal is output as a high signal, thereby scanning a stream B of the key matrix unit 104.

Subsequently, the input values of the input ports P5 to P8 are detected. As the result of the key input determination, if the signal input via the input ports P5 to P8 has at least one high signal, it is determined that the user has input the key and then the key input flag is set as 1. Then, the key value is stored in the RAM and the interrupt is enabled.

By performing the above process, key inputs of the encoder and key matrix unit are detected. To summarize, the main routine of the microcomputer 101 will now be described with reference to FIG. 6B.

Figure 6B:
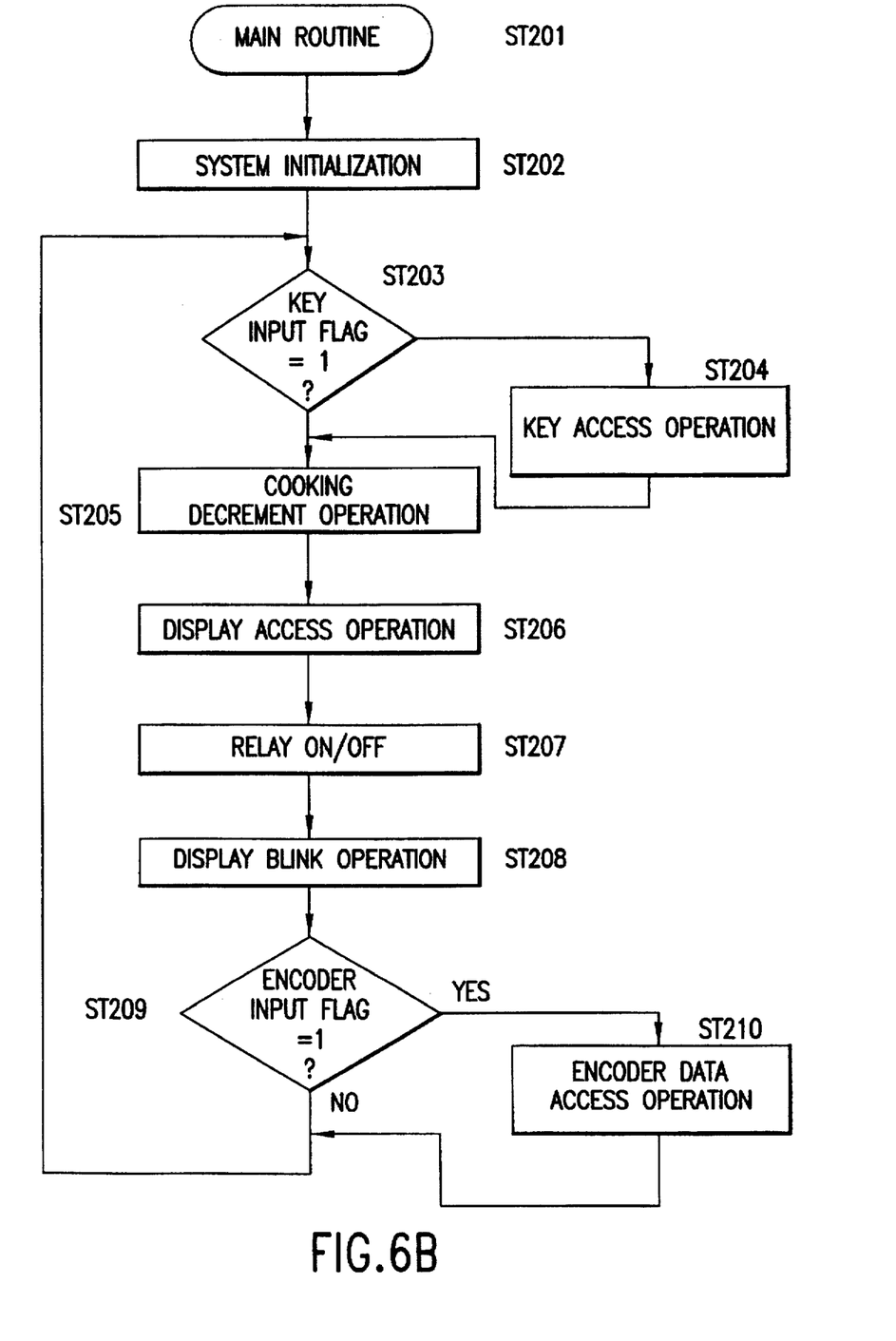

First, the microcomputer 101 performs a system initialization process to initialize the system (Step 202). a key input flag is detected in the system initialized state and it is determined whether the key input flag is set as 1 (Step 203). If the key input flag is set as 1, the key access is operated to perform the function depending on the corresponding key (Step 204).

As the result of detecting the key input flag, if the key input flag is set as 0, it is determined that there is no key input and then the cooking decrement operation is performed. After the above steps, the access of display RAM is operated to then turning the relay on and off (Steps 206 and 207).

Thereafter, a display blink operation is performed (Step 208). Then, the encoder input is read and it is determined whether the encoder input flag is 1 or not (Step 209). As the result, if there is a change in the read encoder input, i.e., encoder input flag is 1, it is determined that the encoder is turned and then the access operation by which the data of the encoder data key, i.e., cooking data, are increased or decreased to the corresponding RAM, is performed. If there is no change in encoder input, the above steps after the system initialization step are iterated again (Step 210).

As described above, according to the present invention, a common input port for a microcomputer can be implemented by having encoder input and key matrix input in common, thereby reducing the number of the input ports of the microcomputer, which contributes to saving the manufacturing cost.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims.

What is claimed is:

1. A control system for a microwave oven comprising;

a key matrix unit including a set of matrix output ports, a first set of matrix input ports, a first set of lines parallelly connecting said first set of matrix input ports to said set of matrix output ports, a second set of matrix input ports, a second set of parallel lines connected at one end thereof to said second set of matrix input ports, each one of the lines in said second set of parallel lines having a plurality of switches for connecting its respective line in said second set to each one of said first set of parallel lines; wherein operation of each one the switches to a closed position connects a respective one of said second set of input ports via a respective one of the lines in said second set of parallel lines, the closed switch and a respective one of said first set of parallel lines to a respective one of said matrix output ports;

an encoder circuit including an encoder input port, a set of encoder output ports parallelly connected to said first set of matrix input ports, a plurality of parallel encoder lines interconnecting said encoder input port and said set of encoder output ports, and a selectively operable encoder switch in each one of the parallel encoder lines between said encoder input port and a respective one of said encoder output ports; wherein operation of each one of the encoder switches to a closed position connects said encoder input port via a respective one of the parallel encoder lines, the closed encoder switch, a respective one of said encoder output ports, a respective one of said first set of matrix input ports, a respective one of said first set of lines to a respective one of said matrix output ports;

a display unit having a set of parallel input ports for displaying current functions; and means including a microcomputer for generating output signals to control said key matrix unit, said encoder circuit and said display unit;

said microcomputer comprising a plurality of input ports connected by parallel input lines to said matrix output ports, a plurality of output ports connected by parallel output lines to said display unit, a first one of said microcomputer output lines being additionally connected to said encoder input port, and the other microcomputer output lines each being also connected to a different one of said second set of matrix input ports.

2. The system of claim 1 wherein said microcomputer further comprises means for controlling the operating functions of the microwave oven in accordance with the following program:

(a) generating a first display signal on said first microcomputer output line to said encoder input port, and detecting values at said microcomputer input ports to determine the presence or absence of a key input;

(b) if there is a change in the encoder key input, an encoder input flag is set as 1, encoder data is stored in a RAM and an interrupt is enabled, and a display signal is applied to said input port of said encoder to detect the input change of said encoder;

(c) after a predetermined period of time, a second display signal is applied via a second one of said microcomputer output lines to a one of said second set of matrix input ports and thus scan a one of said second set of parallel lines of said matrix unit;

(d) scanning the input ports of said microcomputer to determine the presence of absence of key inputs;

(e) if the signal input via the input ports of said microcomputer represents a normal key input having at least one signal, the key input flag is set at 1 and the key value is stored in the RAM and the interrupt is enabled;

(f) after another predetermined period of time, a third display signal is applied via a third one of said microcomputer output lines to another one of said second set of matrix input ports and thus scan another one of said second set of parallel lines of said matrix unit;

(g) again scanning the input ports of said microcomputer to determine the presence of absence of key inputs;

(h) if the signal input via the input ports of said microcomputer represents a normal key input having at least one signal, the key input flag is set at 1 and the key value is stored in the RAM and the interrupt is enabled; and (i) repeating (f) through (h) until all lines of said second set of parallel lines of said matrix unit are scanned;

wherein when the key input flag in set at 1 the oven is operated in response to the key value stored in the RAM.

3. A method of operating a control system for a microwave oven including;

a key matrix unit including a set matrix output ports, a first set of matrix input ports, a first set of lines connecting in parallel said first set of matrix input ports to said set of matrix output ports, a second set of matrix input ports, a second set of parallel lines connected at one end thereof to said second set of matrix input ports, each one of the lines in said second set of parallel lines having a plurality of switches for connecting its respective line in said second set to each one of said first set of parallel lines; wherein operation of each one the switches to a closed position connects a respective one of said second set of input ports via a respective one of the lines in said second set of parallel lines, the closed switch and a respective one of said first set of parallel lines to a respective one of said matrix output ports;

an encoder circuit including an encoder input port, a set of encoder output ports connected in parallel to said first set of matrix input ports, a plurality of parallel encoder lines interconnecting said encoder input port and said set of encoder output ports, and a selectively operable encoder switch in each one of the parallel encoder lines between said encoder input port and a respective one of said encoder output ports; wherein operation of each one of the encoder switches to a closed position connects said encoder input port via a respective one of the parallel encoder lines, the closed encoder switch, a respective one of said encoder output ports, a respective one of said first set of matrix input ports, a respective one of said first set of lines to a respective one of said matrix output ports;

a display unit having a set of parallel input ports for displaying current functions; and means including a microcomputer for generating output signals to control said key matrix unit, said encoder circuit and said display unit;

said microcomputer comprising a plurality of input ports connected by parallel input lines to said matrix output ports, a plurality of output ports connected by parallel output lines to said display unit, a first one of said microcomputer output lines being additionally connected to said encoder input port, and the other microcomputer output lines each being also connected to a different one of said second set of matrix input ports with a program stored in said microcomputer comprising:

(a) generating a first display signal on said first microcomputer output line to said encoder input port, and detecting values at said microcomputer input ports to determine the presence or absence of a key input;

(b) if there is a change in the encoder key input, an encoder input flag is set as 1, encoder data is stored in a RAM and an interrupt is enabled, and a display signal is applied to said input port of said encoder to detect the input change of said encoder;

(c) after a predetermined period of time, a second display signal is applied via a second one of said microcomputer output lines to a one of said second set of matrix input ports and thus scan a one of said second set of parallel lines of said matrix unit;

(d) scanning the input ports of said microcomputer to determine the presence or absence of key inputs;

(e) if the signal input via the input ports of said microcomputer represents a normal key input having at least one signal, the key input flag is set at 1 and the key value is stored in the RAM and the interrupt is enabled;

(f) after another predetermined period of time, a third display signal is applied via a third one of said microcomputer output lines to another one of said second set of matrix input ports and thus scan another one of said second set of parallel lines of said matrix unit;

(g) again scanning the input ports of said microcomputer to determine the presence or absence of key inputs;

(h) if the signal input via the input ports of said microcomputer represents a normal key input having at least one signal, the key input flag is set at 1 and the key value is stored in the RAM and the interrupt is enabled; and (i) repeating (f) through (h) until all lines of said second set of parallel lines of said matrix unit are scanned; wherein when the key input flag in set at 1 the oven is operated in response to the key value stored in the RAM.

\* \* \* \* \*